(12) United States Patent
Wada

(10) Patent No.: US 7,493,385 B2
(45) Date of Patent: Feb. 17, 2009

(54) CLIENT SUPPORT SYSTEM

(75) Inventor: Atsushi Wada, Kyoto (JP)

(73) Assignee: ARKRAY, Inc., Kyoto (JP)

( * ) Notice: Subject to any disclaimer, the term of this patent is extended or adjusted under 35 U.S.C. 154(b) by 911 days.

(21) Appl. No.: 10/380,819

(22) PCT Filed: Sep. 19, 2001

(86) PCT No.: PCT/JP01/08126

§ 371 (c)(1),
(2), (4) Date: Jun. 19, 2003

(87) PCT Pub. No.: WO02/25458

PCT Pub. Date: Mar. 28, 2002

(65) Prior Publication Data

US 2004/0083427 A1    Apr. 29, 2004

(30) Foreign Application Priority Data

Sep. 20, 2000    (JP) ............................. 2000-285529

(51) Int. Cl.
*G06F 15/173* (2006.01)
*G06F 15/16* (2006.01)
(52) U.S. Cl. ...................... 709/224; 709/219
(58) Field of Classification Search ................. 709/203, 709/219, 224, 248
See application file for complete search history.

(56) References Cited

U.S. PATENT DOCUMENTS

| | | | |
|---|---|---|---|
| 6,003,078 A | 12/1999 | Kodimer et al. | |
| 6,088,816 A * | 7/2000 | Nouri et al. | 709/224 |
| 6,101,610 A * | 8/2000 | Beebe et al. | 713/324 |
| 6,208,338 B1 | 3/2001 | Fischer et al. | |
| 6,401,116 B1 | 6/2002 | Okigami | |

FOREIGN PATENT DOCUMENTS

| | | |
|---|---|---|
| GB | 2 333 169 | 7/1999 |
| JP | 63-268025 | 11/1988 |
| JP | 5-210471 | 8/1993 |
| JP | 5-316826 | 8/1993 |

(Continued)

OTHER PUBLICATIONS

"Five Steps of Uses of PDF" WIN DTP, vol. 1, Kohgakusha Co., Ltd., May 10, 1999, p. 79-80.

(Continued)

*Primary Examiner*—Jeffrey Pwu
*Assistant Examiner*—Benjamin R Bruckart
(74) *Attorney, Agent, or Firm*—Hamre, Schumann, Mueller & Larson, P.C.

(57) ABSTRACT

A maker of a measuring device provides, on a client support system, a WWW server for providing the operation manual of the measuring device in an HTML format, and an ordered article control server for performing a supply control on the expendables of a measuring device. The measuring device has a browsing function, and a monitor unit monitors the status of a control unit to display a proper page in the operation manual on a monitor by requesting a transfer of a URL to the WWW server (24) according to the status of the control unit at that time. Ordering of expendables is possible by means of an ordering screen incorporated in the operation manual.

26 Claims, 15 Drawing Sheets

FOREIGN PATENT DOCUMENTS

| | | |
|---|---|---|
| JP | 7-28781 | 1/1995 |
| JP | 9-101909 | 4/1997 |
| JP | 10-31795 | 2/1998 |
| JP | 10-154181 | 6/1998 |
| JP | 2000-179848 | 6/2000 |
| JP | 2001-67417 | 3/2001 |
| WO | 98/21679 | 5/1998 |

OTHER PUBLICATIONS

Sugimatsu, et al., "Diagnostic information providing Web for retailers", Seminar Material of Institute of Electrical Engineering of Japan, Seminar of Informatization Industrial system, Jan. 27, 2000, p. 59-64 (IIS-00-11).

* cited by examiner

FIG. 9

CLIENT SUPPORT SYSTEM

TECHNICAL FIELD

The present invention relates to a client-server system in which a client device and a server device are connected to each other via a communication line. In particular, it relates to a client support system for supporting the work of a client by providing an operation manual of the client device described in a hypertext format from a server device.

BACKGROUND ART

Conventionally, a client-server type system, in which a client device and a server device are connected to each other via a communication line and the server device provides the client device with service for supporting the work of a client has been known and used in various fields.

Furthermore, in recent years, in accordance with the advent of a small and thin display such as a liquid crystal display and the improvement in the performance of a microprocessor, some attempts have been made to incorporate a display and a microprocessor into not only a computer but also devices in various technical fields and to use the WWW (World Wide Web) of the Internet by way of such devices.

By the way, as an operation manual for devices in all technical fields, for example, a measuring device, an analyzing device, a manufacturing device, a processing device, an information processing device, or the like, the fact is that printed manuals are mainly used even now. Therefore, an operator of such a device has to search for the necessary part by turning pages of the printed manual during operation if necessary. Thus there has been a problem that the working efficiency is reduced.

DISCLOSURE OF THE INVENTION

It is an object of the present invention to provide a client support system in which an arbitrary device such as a measuring device is to be a client device having a browsing function and being accessible to a server device via a communication line and an operation manual is provided from the server device, thereby improving the working efficiency of the client device.

In order to achieve the above-mentioned object, a first client support system of the present invention includes a client device including a display unit for analyzing a page description language to be displayed, and a server device accessed by the client device via a communication line and providing the client device with an operation manual in which each page is described in the page description language, wherein the client device includes a monitor unit for monitoring the status of the client device and a communication control unit for accessing the server device via the communication line, and the monitor unit requests a page in the operation manual in accordance with the status of the client device via the communication control unit, and the server device sends the page requested by the client device to the client device.

With this system, a proper page of the operation manual is requested from the server device by the client device in accordance with the status of the client device (waiting status, normal operation status, maintenance status, trouble status, or the like). Then, a page description language sent from the server device to the client device in accordance with this request is analyzed and displayed in the display unit of the client device. Note here that the page description language represents, for example, a WEB page description language, etc.

Thus, since an operator of the client device can advance work with reference to a proper page in accordance with the status of the client device, it is not necessary to search the operation manual for a proper page as conventionally. Consequently, it is possible to provide a client support system capable of significantly improving the working efficiency of the client device in use.

Note here that the technical field and application of use of the client device is arbitrary, and the present invention can be carried out by using any client devices such as a measuring device, an analyzing device, a manufacturing device, a processing device, an information processing device, or the like. Furthermore, the operation manual can include not only an operation procedure for achieving the main object of the client device (for example, to execute measurement in the case of a measuring device) but also any operation procedures, for example, a procedure for an initial setting when the client device is used for the first time, a maintenance procedure, a procedure of handling error or trouble, etc.

Furthermore, a second client support system includes a client device including a display unit for analyzing a page description language to be displayed, and a server device accessed by the client device via a communication line and providing the client device with an operation manual in which each page is described in the page description language, wherein the client device includes a monitor unit for monitoring the status of the client device and a communication control unit for accessing the server device via the communication line, and the monitor unit sends information that represents the status of the client device via the communication control unit, and the server device sends a page in the operation manual in accordance with the status of the client device to the client device based on the information sent from the client device.

With this second client support system, information that represents the status of the client device is sent to the server device, and a page in accordance with the status of the client device is selected from the operation manual and sent to the client device.

Thus, since an operator of the client device can advance work with reference to a proper page in accordance with the status of the client device, it is not necessary to search the operation manual for a proper page as conventionally. Consequently, it is possible to provide a client support system capable of significantly improving the working efficiency of the client device in use.

In the above-mentioned client support system, it is preferable that the client device includes at least two routes of power supplies; and the display unit, the monitor unit and the communication control unit are connected to a second route of power supply that is different from a first route of power supply to be turned off at the time of a maintaining process.

In general, when a maintaining process is carried out, for safety of an operator, the operator is obliged to turn off the power supply at least at the site to be maintained. With the above-mentioned configuration, since a component part necessary to display an operation manual is connected to a second route of power supply that is different from a first power supply that is turned off at the time of maintaining process, it is possible to display the operation manual even after the first power supply is turned off. Note here that the maintaining process includes not only a maintaining inspection process but also any other processes necessary to maintain a normal operation status, for example, a maintenance process, an error handling, a trouble shooting, or the like.

Furthermore, it is preferable that the display unit of the client device includes a display status storage unit for storing the display status before starting the maintaining process, and the display unit returns to the display status read out from the display status storage unit when the first power supply is turned on after the maintaining process is finished.

Thus, after the maintaining process is finished, since a page of the operation manual displayed before the maintaining process is started, an operator of the client device easily can return to the work at the time before the maintaining process was started.

It is preferable that the operation manual includes an ordering screen that interactively receives an order for implements or components of the client device and forms order data, the client device includes an input processing unit for receiving the input with respect to the ordering screen and at the same time sends the order data to the server device by the communication control unit, and the server device receives the order data and performs a supply process for the implements or components based on the received order data.

With this configuration, an operator of the client device can order implements or components simply by inputting the necessary information in the ordering screen.

It is preferable that in the operation manual, the ordering screen for components is incorporated in a page including the description of the replacement of components of the client device.

Thus, an operator of the client device can order replacement components, etc. by means of the ordering screen easily at the same time of replacing expendables, etc. in, for example, the maintenance process or a trouble shooting of the client device. Thus, it is possible to prevent forgetting to order components.

Furthermore, it is preferable that in an operation manual, the ordering screen for components is incorporated in a page explaining a series of operation procedures including the replacement of components of the client device and being displayed later than the page including the description of the replacement of components.

Thus, immediately after the replacement of expendables, etc. is finished in, for example, the maintenance process or trouble shooting of the client device, the operator of the client device can order the replacement components, etc. easily by means of the ordering screen, thus making it possible to prevent forgetting to order components.

It is preferable that in the operation manual, the ordering screen for components is incorporated in a page called by a hyperlink from the page including the description of the replacement of components of the client device.

Also in this case, immediately after the replacement of expendables, etc. is finished, the operator of the client device can order the replacement components, etc. by means of the ordering screen easily, thus making it possible to prevent forgetting to order components.

It is preferable that the client support system further includes a supply control device for controlling the supply process of implements or components for the client device, wherein the supply process of implements or components includes sending the order data from the server device to the supply control device.

According to this configuration, all the server device has to do is to receive the order data from the client device and send them to the supply control unit. Actual supply procedures such as delivery and shipment of implements or components, and issuing bills, etc. are carried out in the supply control device, etc. Thus, it is possible to realize a mechanism for supplying the client device with implements or components without burdening the server device with too much load.

In order to achieve the above-mentioned object, a first client device of the present invention includes a communication control unit for accessing a server device providing an operation manual in which each page is described in a page description language via a communication line, and a display unit for analyzing the page description language to be displayed, the server device sending a page requested by the client device of the operation manual to the client device, and further including a monitor unit for monitoring the status of the client device, the monitor unit requesting a page of the operation manual in accordance with the status of the client device via the communication control unit.

With this configuration, a proper page of the operation manual is requested in accordance with the status of the client device (waiting status, normal operation status, maintenance status, trouble status, or the like) and then a page description language sent from the server device is analyzed in the display unit to be the displayed. Thus, it is possible to display a proper page in accordance with the status of device.

Thus, since an operator of the client device can advance work with reference to a proper page in accordance with the status of the client device, it is not necessary to search the operation manual for a proper page as conventionally. Consequently, it is possible to provide a client device having a high working efficiency.

Furthermore, in order to achieve the above-mentioned object, a second client device of the present invention includes a communication control unit for accessing the server device providing a page of the operation manual in accordance with the status of the client device in which each page is described in a page description language via a communication line, a display unit for analyzing the page description language to be displayed, and a monitor unit for monitoring the status of the client device, wherein the monitor unit sends information that represents the status of the client device to the server device via the communication control unit.

With this configuration, a proper page of the operation manual is sent from the server device in accordance with the status of the client device (waiting status, normal operation status, maintenance status, trouble status, or the like) and then the page description language sent from the server device is analyzed and displayed in a display unit. Thus, it is possible to display a proper page in accordance with the status of device.

Thus, since an operator of the client device can advance work with reference to a proper page in accordance with the status of the client device, it is not necessary to search the operation manual for a proper page as conventionally. Consequently, it is possible to provide a client device having a high working efficiency.

It is preferable that the client device includes at least two routes of power supplies; and the display unit, the monitor unit and the communication control unit are connected to a second route of power supply that is different from a first route of power supply to be turned off at the time of a maintaining process.

In general, when a maintaining process is carried out, for safety of an operator, the operator is obliged to turn off the power supply at least at the site to be maintained. With the above-mentioned configuration, since a component part necessary to display an operation manual is connected to a second route of power supply that is different from a first power supply that is turned off at the time of the maintaining process, it is possible to display the operation manual even after the first power supply is turned off. Note here that the maintaining process includes not only a maintaining inspection process but also any other processes necessary to maintain a normal operation status, for example, a maintenance process, an error handling, a trouble shooting, or the like.

Furthermore, it is preferable that the display unit of the client device includes a display status storage unit for storing the display status before starting the maintaining process, and the display unit returns to the display status read out from the display status storage unit when the first power supply is turned on after the maintaining process is finished.

Thus, after the maintaining process is finished, since a page of the operation manual displayed before the maintaining process is started, an operator of the client device easily can return to the work at the time before the maintaining process was started.

In the client device, it is preferable that the operation manual includes an ordering screen that interactively receives an order for implements or components of the client device and forms order data, and further including an input processing unit for receiving the input with respect to the ordering screen and at the same time sending the order data to the server device by the communication control unit.

With this configuration, an operator of the client device can order implements or components from the server device only by inputting the necessary information in an ordering screen.

In the client device, it is preferable that in the operation manual, the ordering screen for components is incorporated in a page including the description for the replacement of components of the client device.

Thus, an operator of the client device can order replacement components, etc. by means of the ordering screen easily at the same time of replacing expendables, etc. in, for example, the maintenance process or a trouble shooting of the client device. Thus, it is possible to prevent forgetting to order components.

In the client device, it is preferable that in an operation manual, the ordering screen for components is incorporated in a page explaining a series of operation procedures including the replacement of components of the client device and being displayed later than the page including the description of the replacement of components.

Thus, immediately after the replacement of expendables, etc. is finished in, for example, the maintenance process or trouble shooting of the client device, the operator of the client device can order the replaced components, etc. by means of the ordering screen easily, thus making it possible to prevent forgetting to order components.

In the client device, it is preferable that in the operation manual, the ordering screen for components is incorporated in a page called by a hyperlink from the page including the description of the replacement of components of the client device.

Also in this case, immediately after the replacement of expendables, etc. is finished, the operator of the client device can order the replaced components, etc. easily by means of the ordering screen, thus making it possible to prevent forgetting to order components.

In order to achieve the above-mentioned object, a first server device of the present invention is accessed by a client device via a communication line and provides the client device with an operation manual of the client device, the client device including a display unit for analyzing a page description language to be displayed and requesting a page in accordance with the status of the client device in the operation manual, the server device including a storage unit for storing each page of the operation manual described in the page description language, and a communication control unit for sending and receiving data, wherein the server device receives a request of a page of the operation manual in accordance with the statues of the client device from the client device by way of the communication control unit, obtains the requested page from the storage unit, and sends it to the client device.

With this configuration, the server device sends a proper page of the operation manual in accordance with the status of the client device (waiting status, normal operation status, maintenance status, trouble status, or the like). Then, the page description language sent from the server device in accordance with this request is analyzed in the display unit of the client device to be displayed.

Thus, since an operator of the client device can advance work with reference to a proper page in accordance with the status of the client device, it is not necessary to search the operation manual for a proper page as conventionally. Consequently, it is possible to provide a client support system capable of significantly improving the working efficiency of the client device.

Furthermore, in order to achieve the above-mentioned object, a second server device of the present invention is accessed by a client device including a display unit for analyzing a page description language to be displayed via a communication line and provides the client device with an operation manual of the client device, which is described in the page description language, the server device including a storage unit for storing each page of the operation manual, and a communication control unit for sending and receiving data, wherein the server device receives the information that represents the status of the client device from the client device by way of the communication control unit, and obtains the requested page in the operation manual from the storage unit, and sends it to the client device.

With this configuration, the server device sends a proper page of the operation manual in accordance with the status of the client device (waiting status, normal operation status, maintenance status, trouble status, or the like). Then, the page description language sent from the server device in accordance with this request is analyzed in the display unit of the client device to be displayed.

Thus, since an operator of the client device can advance work with reference to a proper page in accordance with the status of the client device, it is not necessary to search the operation manual for a proper page as conventionally. Consequently, it is possible to provide a client support system capable of significantly improving the working efficiency of the client device.

In the server device, it is preferable that the operation manual includes an ordering screen that interactively receives an order for implements or components of the client device and forms order data, the order data are sent from the client device to the server device via the communication line, and the sever device receives the order data from the client device by way of the communication control unit and performs a supply process for the implements or components.

With this configuration, an operator of the client device can order implements or components from the sever device only by inputting the necessary information in an ordering screen.

In the server device, it is preferable that in the operation manual, the ordering screen for components is incorporated in a page including the description of the replacement of components of the client device.

Thus, an operator of the client device can order replacement components, etc. by means of the ordering screen easily at the same time of replacing expendables, etc. in, for example, the maintenance process or a trouble shooting of the client device. Thus, it is possible to prevent forgetting to order components.

In the server device, it is preferable that in an operation manual, the ordering screen for components is incorporated in a page explaining a series of operation procedures including the replacement of components of the client device and being displayed later than the page including the description of the replacement of components.

Thus, immediately after the replacement of expendables, etc. is finished in, for example, the maintenance process or trouble shooting of the client device, the operator of the client device can order the replacement components, etc. by means of ordering screen easily, thus making it possible to prevent forgetting to order components.

In the server device, it is preferable that in the operation manual, the ordering screen for components is incorporated in a page called by a hyperlink from the page including the description of the replacement of components of the client device.

Also in this case, immediately after the replacement of expendables, etc. is finished, the operator of the client device can order the replacement components, etc. by means of the ordering screen easily, thus making it possible to prevent forgetting to order components.

In the server device, it is preferable that the supply process for implements or components includes sending the order data to the supply control unit for controlling the supply of implements or components with respect to the client device.

According to this configuration, all the server device has to do is to receive the order data from the client device and send them to the supply control unit. Actual supply procedures such as delivery and shipment of implements or components, and issuing bills, etc. are carried out in the supply control device, etc. Thus, it is possible to realize a mechanism for supplying the client device with implements or components without burdening the server device with too much load.

In order to achieve the above-mentioned object, a first information recording medium of the present invention records an operation manual provided from a server device to a client device in a client support system including a client device having a display unit for analyzing a page description language to be displayed and a server device accessed by the client device via a communication line and providing the client device with an operation manual of the client device in which each page is described in the page description language, the client system requesting a page of the operation manual in accordance with the status in the client device, wherein the operation manual is divided into pages in accordance with the status of the client device and the operation procedure of the client device is described in each page with the use of the page description language.

The operation manual recorded in this information recording medium is used in the client support system, thereby enabling an operator of the client device to advance work with reference to a proper page in accordance with the status of the client device, so that it is not necessary to search the operation manual for a proper page as conventionally. Consequently, it is possible to provide a client support system capable of significantly improving the working efficiency of the client device in use.

Furthermore, in order to achieve the above-mentioned object, a first information recording medium of the present invention records an operation manual provided from a server device to a client device in a client support system including a client device having a display unit for analyzing a page description language to be displayed, and a server device accessed by the client device via a communication line and providing the client device with an operation manual of the client device in which each page is described in the page description language, the client device sending information that represents the status of the client device and the server device sending the page in accordance with the status of the client device, wherein the operation manual is divided into pages in accordance with the status of the client device and the operation procedure of the client device is described in each page with the use of the page description language.

By using an operation manual recorded in this information recording medium in the client support system, an operator of the client device can advance work with reference to a proper page in accordance with the status of the client device, so that it is not necessary to search for a proper page of the operation manual as conventionally. Consequently, it is possible to provide a client support system capable of significantly improving the working efficiency of the client device in use.

In the above-mentioned information recording medium, it is preferable that the operation manual includes an ordering screen that interactively receives an order for implements or components of the client device and forms order data.

Thus, an operator of the client device can order implements or components from the server device only by inputting the necessary information in an ordering screen.

In the above-mentioned information recording medium, it is preferable that in the operation manual, the ordering screen for components is incorporated in a page including the description of the replacement of components of the client device.

Thus, an operator of the client device can order replacement components, etc. by means of the ordering screen easily at the same time of replacing expendables, etc. in, for example, the maintenance process or a trouble shooting of the client device. Thus, it is possible to prevent forgetting to order components.

In the above-mentioned information recording medium, it is preferable that in an operation manual, the ordering screen for components is incorporated in a page explaining a series of operation procedures including the replacement of components of the client device and being displayed later than the page including the description of the replacement of components.

Thus, immediately after the replacement of expendables, etc. is finished in, for example, the maintenance process or trouble shooting of the client device, the operator of the client device can order the replacement components, etc. by means of the ordering screen easily, thus making it possible to prevent forgetting to order components.

In the above-mentioned information recording medium, it is preferable that in the operation manual, the ordering screen for components is incorporated in a page called by a hyperlink from the page including the description of the replacement of components of the client device.

Also in this case, immediately after the replacement of expendables, etc. is finished, the operator of the client device can order the replacement components, etc. by means of the ordering screen easily, thus making it possible to prevent forgetting to order components.

BRIEF DESCRIPTION OF THE DRAWINGS

FIG. 9 is a view explaining an example of a page displayed when trouble occurs in the measuring device.

BEST MODE OF CARRYING OUT THE INVENTION

Hereinafter, one embodiment of the present invention will be explained with reference to the drawings.

Figure 1:
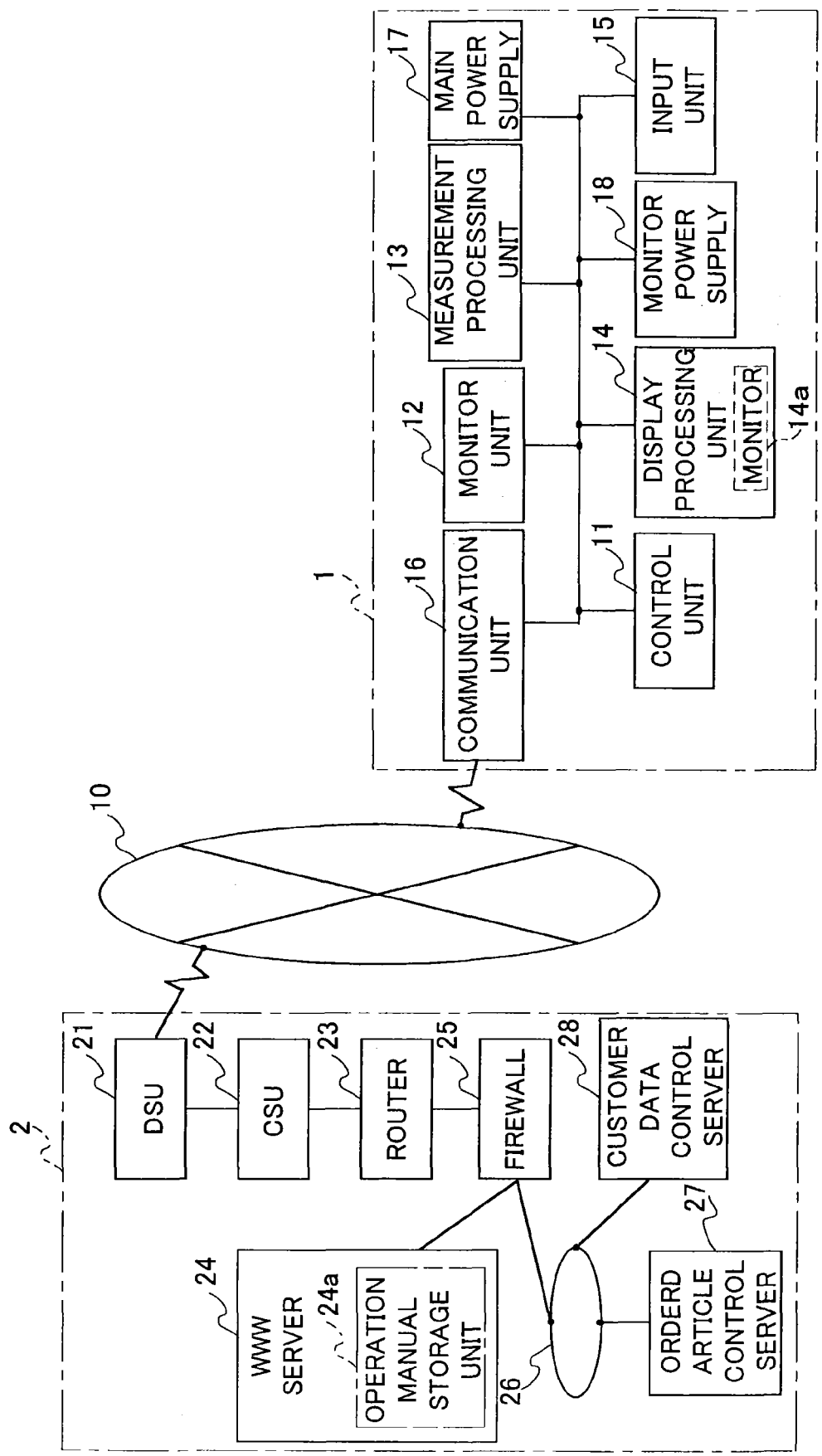
FIG. 1 is a block diagram showing a configuration of a client support system according to one embodiment of the present invention.

FIG. 1 is a block diagram showing a schematic configuration of a client support system according to this embodiment. This system includes a measuring device 1 as a client device and a WWW server 24 as a server device, which are connected to each other via the Internet 10 as a communication line. Note here that a measuring device is given as an example of the client device, but the present invention can be carried out by using any other client devices in various technical fields and with various applications of use. An example of the client device includes an analyzing device, a manufacturing device, a processing device, an information processing device, or the like, in addition to a measuring device.

The measuring device 1 is configured so that it can be connected to the Internet 10 and has a monitor 14a having a browsing function to display HTML documents. Furthermore, a maker A of the measuring device 1 forms an online manual of HTML documents indicating an operation procedure, a maintenance procedure, and a trouble shooting procedure, etc. for the measuring device 1, and allows the online manual to be browsed on the WWW server 24 of the maker A.

From the measuring device 1, in accordance with the status (waiting status, measuring status, or status in trouble) of the inside the device, the designation of a URL of a proper page in the online manual and requests of a transfer of the page to the WWW server 24 are carried out. The WWW server 24 sends HTML data of the page requested by the measuring device 1 to the measuring device 1, and the measuring device 1 analyzes the HTML data to be displayed on the monitor 14a. Thus, an operator of the measuring device 1 usually can refer to a proper page of the online manual while operating the measuring device 1.

Furthermore, the online manual includes an ordering screen for expendables to be replaced at the time of the maintenance or trouble shooting of the measuring device 1 or optional components of the measuring device 1, and an operator of the measuring device 1 can order implements or components from the maker A by inputting necessary information in the ordering screen.

Hereinafter, a configuration and an operation of each part of the expendables order system will be explained in detail.

At first, the configuration of the measuring device 1 will be explained.

The measuring device 1 includes a control unit 11, a monitor unit 12, a measurement processing unit 13, a display processing unit 14, an input unit 15, a communication unit 16, a main power supply 17 and a monitor power supply 18.

The control unit 11 is realized by, for example, a microcomputer and controls the operation of each part of the measuring device 1. The monitor unit 12 monitors the operation of the control unit 11. The control unit 11 outputs a unique code (status code) in accordance with the operation status of its own and outputs from various sensors provided in some parts of the measuring device 1, and the monitor unit 12 determines the operation status of the measuring device 1 based on this status code.

The measurement processing unit 13 has a configuration in accordance with items to be measured of the measuring device 1 and carries out a series of processes relating to the measurement including, for example, detection of a material to be measured, corrections calculation, and storing and input of the measurement results. The display processing unit 14 carries out the process of displaying an image, etc. on the monitor 14a and has a browsing function of displaying an HTML document.

The input unit 15 includes an input device and receives the input from an operator through this input device. Note here that as the input device, a pointing device such as a keyboard, a mouse, etc. or a touch panel incorporated into the monitor 14a can be used.

The communication unit 16 is connected to the Internet 10 and sends/receives data to/from the other computers on the Internet 10. Note here that a connection topology between the measuring device 1 and the Internet 10 may be any one of a dial-up terminal type connection, or dial-up network type connection via a LAN (not shown) of an operator of the measuring device or a leased line connection.

The main power supply 17 and the monitor power supply 18 are two different routes of power supplies that are independent from each other. The monitor power supply 18 supplies electric power to components including a control unit 11, a monitor unit 12, a display processing unit 14, an input unit 15 and a communication unit 16, which relate to the communication with the WWW server 24 and the display of the operation manual. On the other hand, the main power supply 17 supplies electric power to the component such as a measurement processing unit 13, which does not directly relate to the communication with the WWW server 24 and the display of the operation manual.

The reason why two routes of electric power supplies are provided in this way will be mentioned below. That is, when the maintaining process (including any processes necessary to maintain a normal operation status of device, for example, an inspection process, a maintenance process, an error handling, a trouble shooting, or the like) of the measuring device 1, for safety of an operator, the operator is obliged to turn off the power supply of at least the site where the maintaining process is to be carried out. With this configuration, at the time of maintaining process, even if the main power supply 17 is turned off, by supplying electric power to the component portion necessary to display the operation manual from the different route of monitor power supply 18, it is possible to continue to display the operation manual.

Next, an intra-company system 2 of the maker A will be explained.

The intra-company system 2 includes a DSU (Digital Service Unit) 21, a CSU (Channel Service Unit) 22, a router 23, the WWW server 24, a firewall 25 and a LAN 26. To the LAN 26, an intra-company subsystem, etc. of the maker A (for example, an ordered article control server 27 or a customer data control server 28 of a distribution center) is connected.

The WWW server 24 includes an operation manual storage unit 24a storing the operation manual of the measuring device 1. The operation manual is divided into pages in accordance with the status of the measuring device 1 and the operation procedure of the measuring device 1 is described in each page in an HTML.

Note here that the configuration of the intra-company system 2 is not limited to an example shown in FIG. 1. That is, the intra-company system 2 may include, in addition to the component elements shown in FIG. 1, any arbitrary devices including a device concerning the Internet connection, for example, a mail server, a name server, a proxy server, or the like; a computer, etc. necessary to the business of the maker A, and the like.

Furthermore, the connection relationship between the connection elements of the intra-comp any system 2 is not necessarily limited to an example shown in FIG. 1. For instance, in the example shown in FIG. 1, the WWW server 24 is a stand-alone that is not connected to the LAN 26. However, the WWW server 24 may be connected to the LAN 26. Furthermore, in the example shown in FIG. 1, the WWW server 24 is present inside the firewall 25 like the LAN 26. However, the WWW server 24 may be placed outside the firewall 25. Furthermore, each of the WWW server 24 and the LAN 26 may be provided with a firewall 25, respectively.

Figure 2:
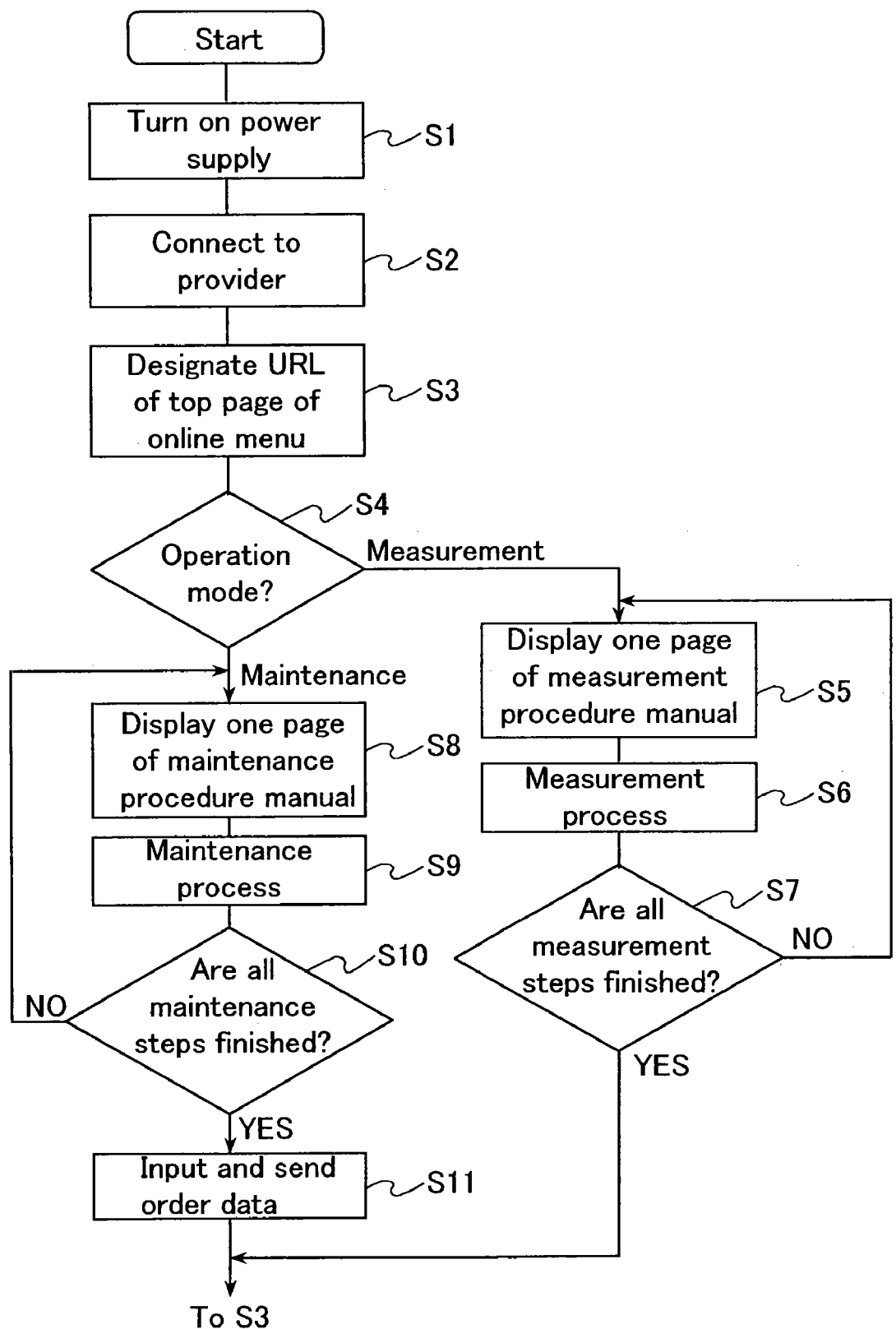
FIG. 2 is a flow chart showing an operation of a measuring device as a client device in the client support system.

Next, the operation of each part of this system will be explained with reference to FIGS. 2 and 3. Note here that FIG. 2 is a flow chart showing an operation procedure of the measuring device 1; and FIG. 3 is a flow chart showing an operation procedure of the WWW server 24 in the intra-company system 2 of the maker A.

When the power supplies (main power supply 17 and monitor power supply 18) are turned on (step S1 of FIG. 2), the communication unit 16 dials up the NOC (Network Operation Center) of a provider at the command of the control unit 11, so that the measuring device 1 is connected to the Internet 10. Note here that an example of the dial-up connection was herein explained, but the connection topology between the measuring device 1 and the Internet 10 is not necessarily limited to the dial-up connection as mentioned above.

Next, the control unit 11 of the measuring device 1 sends a command to the communication unit 16 and designates a URL of a top page of the online manual provided by the maker A to access the WWW server 24 (step S3).

Figure 3:
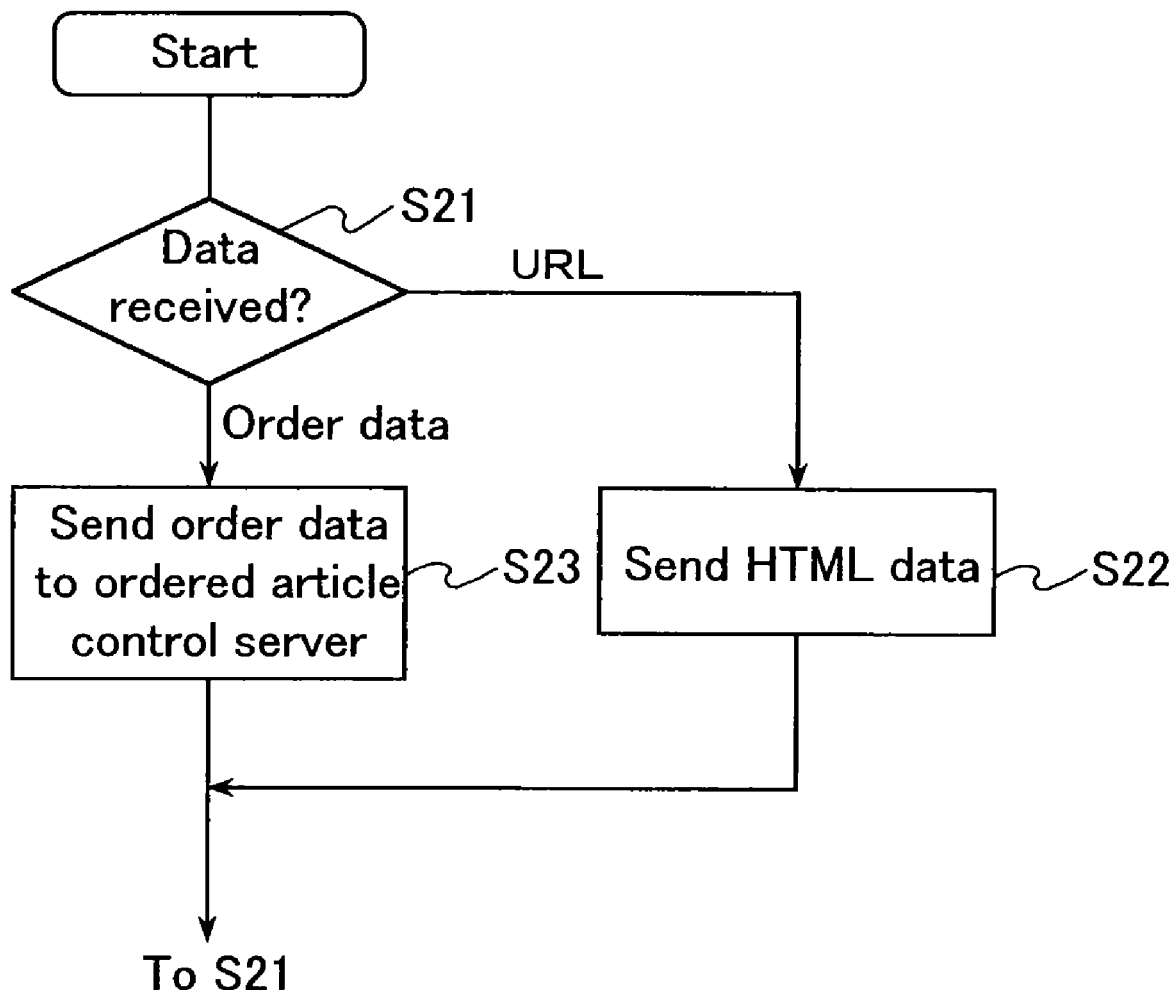
FIG. 3 is a flow chart showing an operation of a WWW server as a server device in the client support system.

When the WWW server 24 receives the designation of URL from the measuring device 1 (step S21 of FIG. 3), it sends HTML data in accordance with the designated URL (in this case, HTML data of the top page of the online manual) to the measuring device 1 (step S22 of FIG. 3).

The communication unit 16 of the measuring device 1 receives the data from the WWW server 24 and submits them to a display processing unit 14 having a browsing function, and thereby the image of the top page is displayed on the monitor 14a of the display processing unit 14 (step S4 of FIG. 2).

Figure 5:
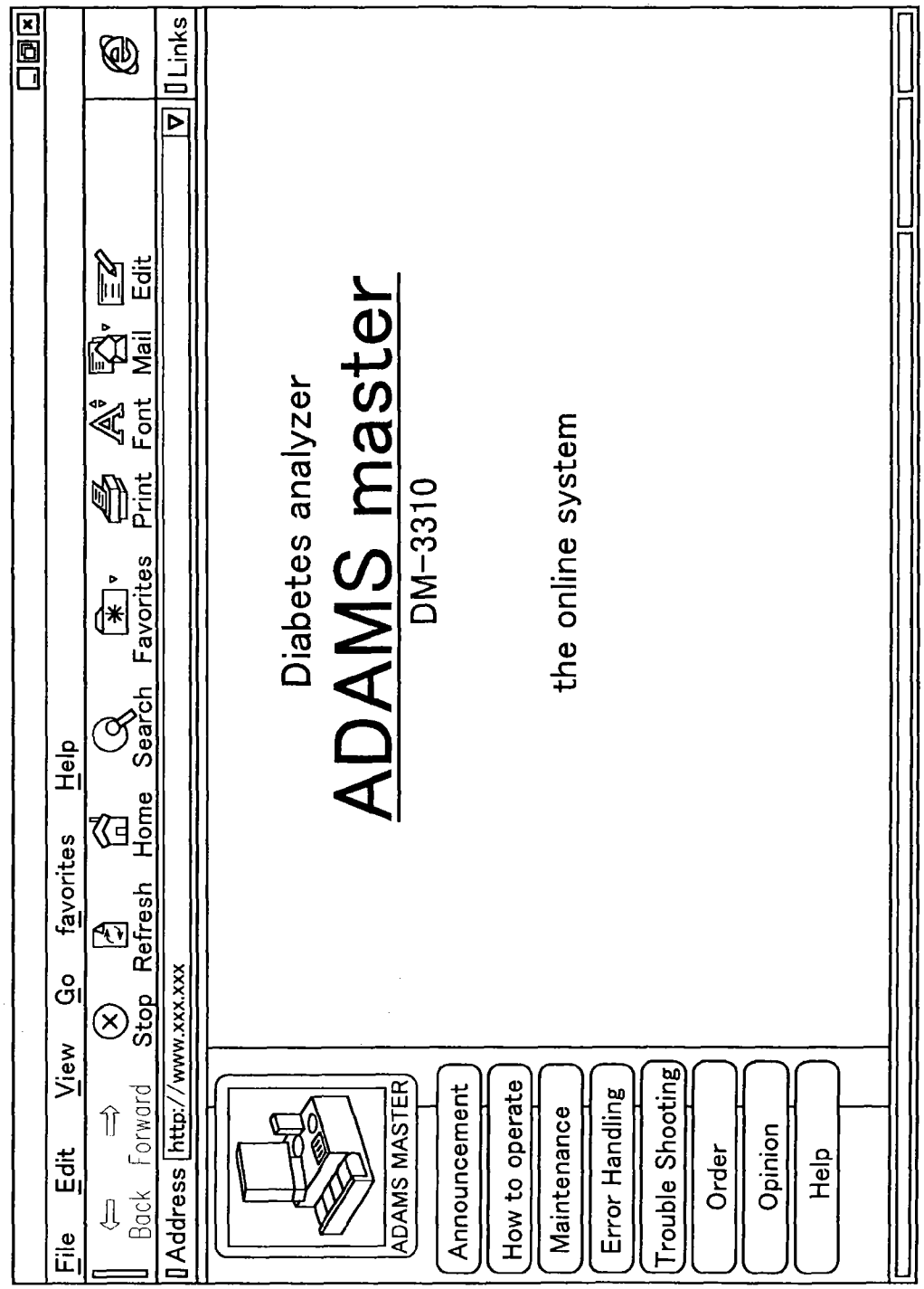
FIG. 5 is a view for explaining an example of a top page of an online manual provided from the WWW server to the measuring device.

The top page of the online manual is configured as a menu screen and one example there is as shown in FIG. 5. An operator of the measuring device 1 selects from the objects displayed on the menu screen, "Announcement," "How to operate" "Maintenance," etc., thereby allowing the detailed manual to be displayed. A touch panel is incorporated in the monitor 14a, so that when the operator touches the touch panel on the object displayed on the screen by the finger, etc. the input unit 15 recognizes that the object is selected.

Figure 6:
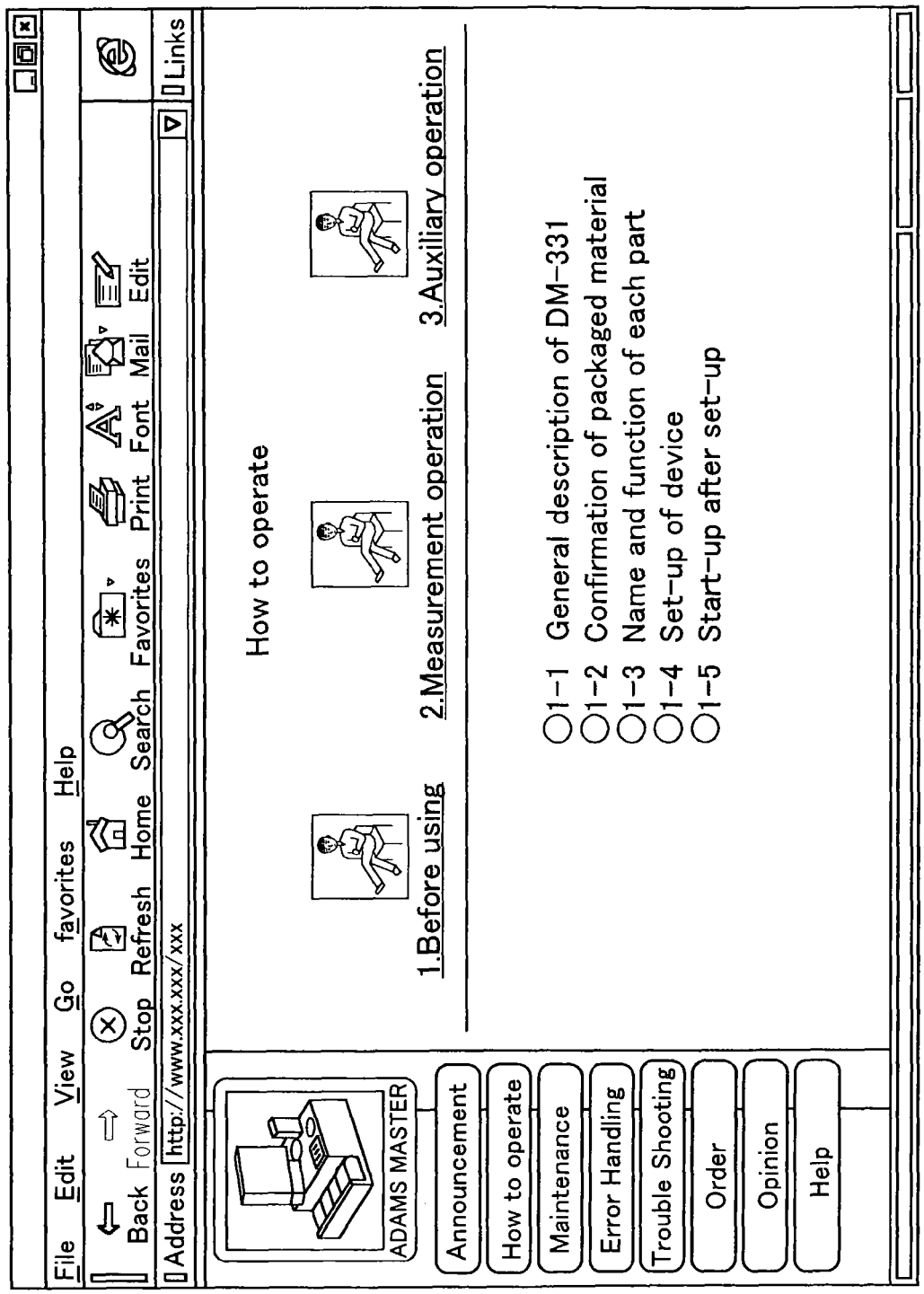
FIG. 6 is a view for explaining one example of a page linked from the top page shown in FIG. 5.
Figure 7:
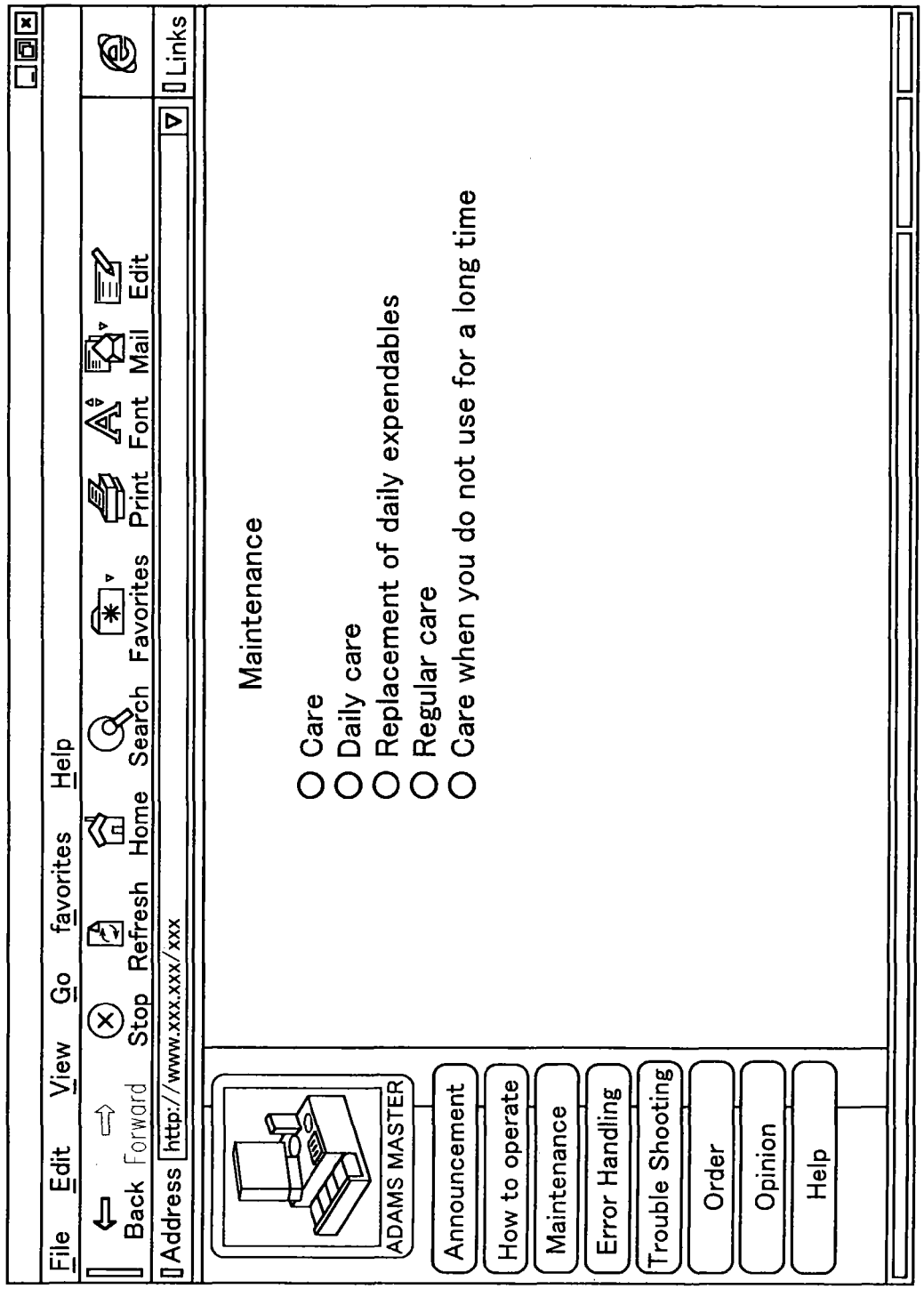
FIG. 7 is a view for explaining another example of a page linked from the top page shown in FIG. 5.

FIGS. 6 and 7 show an example of the page sent from the WWW server 24 and newly displayed, respectively, when an operator selects "How to operate" and "Maintenance" in the menu screen of FIG. 5.

In each object, a hyperlink is set. When the URL designated in the hyperlink selected by an operator is sent to the WWW server 24 via the input unit 15 and the communication unit 16, the HTML data of the URL is sent from the WWW server 24 to the measuring device 1.

Furthermore, in the measuring device 1, besides the selection by an operator, the monitor unit 12 monitors the state of the operation of the control unit 11, and automatically obtains a page in accordance with the operation state of the measuring device 1 from the WWW server 24 and displays thereof. The mechanism thereof will be mentioned below.

As mentioned above, the control unit 11 outputs the unique code (status code) in accordance with its own operation status and the output from various sensors provided in some parts of the measuring device 1 to the monitor unit 12. On the other hand, in the operation manual storage unit 24a of the WWW server 24, each page of the operation manual is provided with a URL in accordance with the status code.

For instance, if the status code when trouble occurs in a certain part of the measuring device 1 is "T0001" a page in which this trouble shooting procedure is described is provided with "T0001.htm" as a URL (path name).

Thus, the monitor unit 12 can determine a URL to be designated based on the status code uniquely and request a proper page in accordance with the status of the measuring device 1 to the WWW server 24 via the communication unit 16.

In the measuring device 1, when the control unit 11 starts a normal measurement operation by the selection of an operator, the monitor unit 12 detects this by the status code output from the control unit 11, sends an indication to the communication unit 16 and designates a URL of a page in which the explanation about the first one step of the measurement procedure in online manual is described to access the WWW server 24. Thus, the communication unit 16 obtains HTML data of the first one page of the measurement procedure manual from the WWW server 24, and the display unit 14 makes the HTML data to be imaged and displays them on the monitor 14a (step S5).

When the operator executes one step of the measurement process while viewing the content displayed on the monitor 14a, a signal indicating that the one step of process was finished normally is sent from the measurement processing unit 13 to the control unit 11 (step S6). On receiving this signal, the control unit 11 updates the status code and determines whether or not all the steps of the measurement processes are finished (step S7). When it determines that all the processes are not finished, the operation returns to the step S5 and is to execute the next step of the measurement process.

At this time, the monitor unit 12 detects this based on the status code from the control unit 11, sends an indication to the communication unit 16 and designates a URL of a page in which the explanation about the next step is described to access the WWW server 24. Thus, the page in which the explanation about the next step is described is obtained from the WWW server 24 and displayed on the monitor 14a.

The above-mentioned operations are repeated until all the steps of the measurement procedure are finished. Thus, since the monitor unit 12 monitors the status code of the control unit 11 and thereby a proper page in accordance with the advancing state of the measuring operation is displayed on the monitor 14a, an operator of the measuring device 1 can complete the measurement operation simply by advancing the operations based on the display on the monitor 14a without operating the online manual.

On the other hand, the maintenance of the measuring device 1 is carried out as follows. In the top page, if an operator selects "Maintenance," the control unit 11 sends a signal to the communication unit 16 and designates a URL of a page in the online manual in which the explanation about the first one step of the maintenance procedure is described to access the WWW server 24.

The WWW server 24 sends the HTML data in accordance with the URL (in this case, HTML data of a page including the explanation about the first one step of the maintenance procedure) to the measuring device 1 (steps S21, S22 of FIG. 3).

The communication unit 16 of the measuring device 1 receives the HTML data from the WWW server 24 and sends it to the display unit 14, and the display unit 14 creates an image of this to be displayed on the monitor 14a (step S8 of FIG. 2).

When the operator executes one step of the maintenance procedure while viewing the content displayed on the monitor 14a, a status code indicating that the one step of process was finished normally is sent from a sensor provided in a place where the maintenance is to be carried out to the control unit 11 (step S9).

Note here that other than the configuration in which a sensor is provided in the maintenance place for allowing the sensor to detect that one step of the maintenance process is finished, there may be a configuration in which the control unit 11 detects that the step is finished by providing each page of the maintenance procedure manual with a "Finish" button, etc. by which an operator can confirm and input when the step described in the page is finished.

When one step of the maintenance process is finished, the control unit 11 determines whether or not all the steps are finished (step S10) and if all the steps are not finished, the operation returns to the step S8. At this time, based on the status code of the control unit 11, the monitor unit 12 detects this, designates a URL of a page in which the explanation about the next step is described, and allows the communication unit 16 to access the WWW server 24. Thus, the page in which the explanation about the next step is described is sent from the WWW server 24 and displayed on the monitor 14a. The above-mentioned operation is repeated until all the steps of the maintenance processes are finished.

Figure 8:
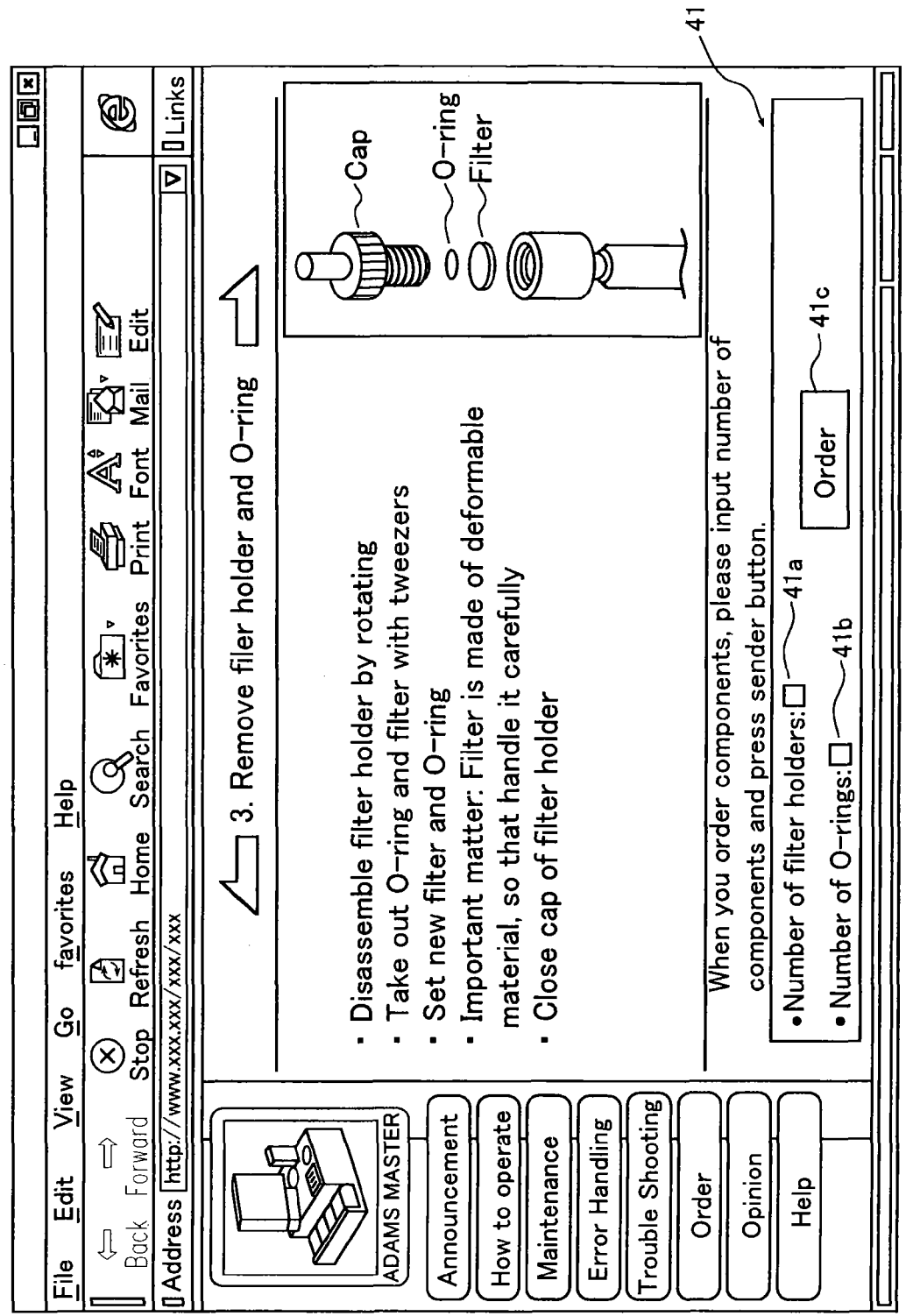
FIG. 8 is a view explaining one page of the online manual for explaining a page including an ordering screen of expendables to be replaced at the time of maintenance.

Note here that in the last page of the maintenance procedure of the measuring device 1, as shown in FIG. 8, an ordering screen 41 for ordering expendables to be replaced at the time of maintenance is incorporated. After all the steps of the maintenance processes are finished, an operator of the measuring device 1 inputs the number of necessary expendables into number entry boxes 41a and 41b in the ordering screen 41, and then presses an order confirmation button 41a with an indication of "Order." Then, the input unit 15 receives this input, and forms order data of expendables (in this case, filter holder and O-ring) and sends them to the WWW server 24 via the communication unit 16 (step S11).

When the WWW server 24 receives the order data from the measuring device 1, the WWW server 24 sends a client number for identifying a client who sent the order data, ordered date, information of expendables for identifying the ordered expendables, and a number of each expendable to the ordered article control server 27 of a distribution center (step S23 of FIG. 3).

The client number is a number assigned to a person who is registered as a user of the measuring device 1. On the intra-company system 2 of the maker A, each user of the measuring device 1 is identified by this client number. For example, when delivering expendables ordered from a client, etc., in the case where detailed information such as address, telephone number, or the like, of each client is needed, such information may be obtained from the client data control server 28 based on the client number.

The ordered article control server 27 carries out the process of delivering the ordered expendables based on such information. Furthermore, such information is sent to the other systems in the maker A (for example, an accounting system, an inventory control system, etc.) via a LAN 26, and can be used for the purpose of issuing bills, inventory controls, or the like.

In this way, since the monitor unit 12 obtains a proper page for the maintenance procedure from the WWW server 24 and allows it to be displayed on the monitor 14a, the operator can carry out the maintenance easily by advancing work in accordance with the content displayed on the monitor 14a. Furthermore, if it is necessary to replace expendables during the maintenance process, since it is possible to order expendables by means of the ordering screen displayed at the end, it is possible to prevent forgetting ordering and to save time and effort.

Furthermore, in the measuring device 1, if some troubles occur during the execution of the measurement, etc., a signal indicating that trouble occurs is sent from a sensor, etc. provided in some parts of the measurement processing unit 13 and the measuring device 1 to the control part 11. In this case, the process that has been executed by the control part 11 is interrupted and trouble shooting starts as mentioned below.

Figure 4:
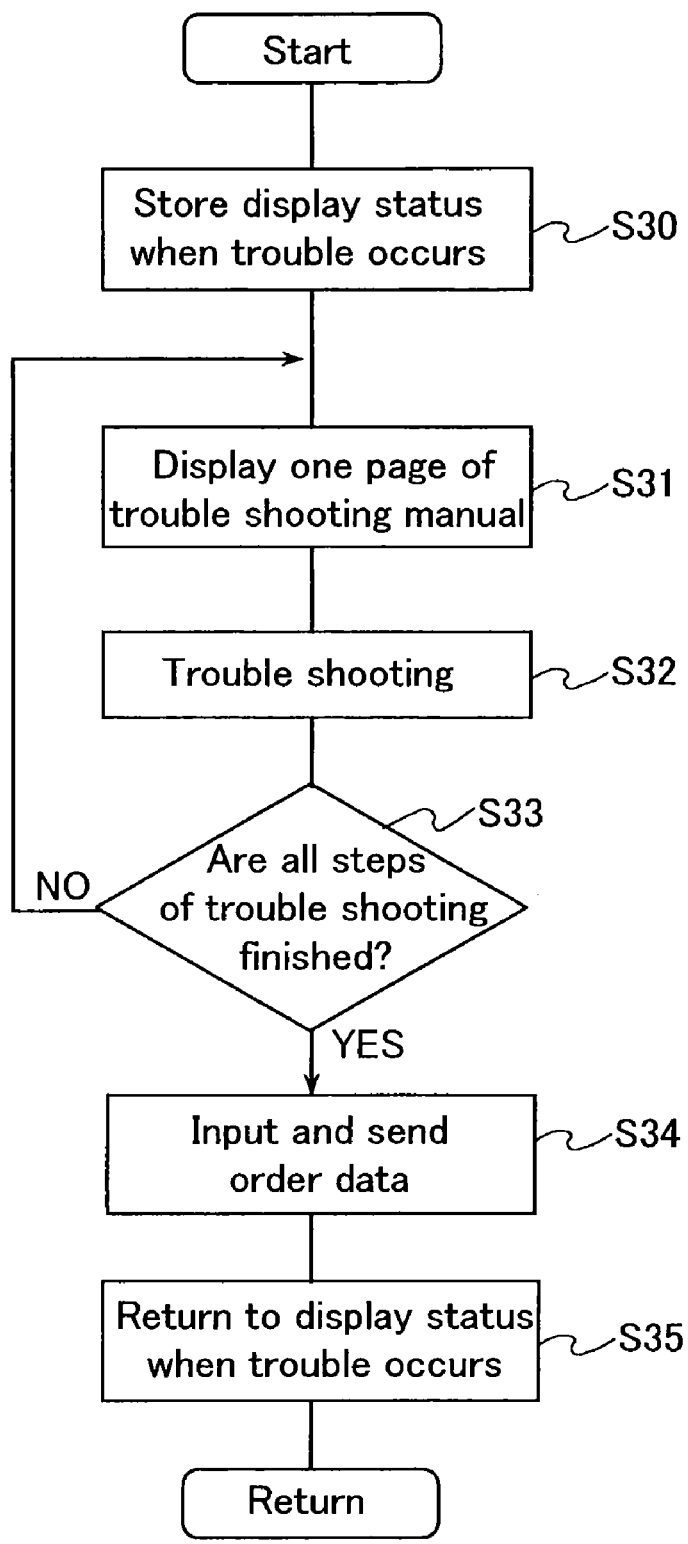
FIG. 4 is a flow chart showing a procedure of an interrupt process when a trouble occurs in the measuring device.

FIG. 4 is a flow chart showing the procedure of a trouble shooting. The control unit 11 firstly sends an indication to the display processing unit 14 and allows the display status of the monitor 14a at the time the trouble occurs to be stored in a storage region (not shown) possessed by the display processing unit 14 (step S30).

Furthermore, the monitor unit 12 detects that trouble occurs from a status code of the control unit 11, sends an indication to the communication unit 16 and designates a URL of a page in which the explanation about the first step of trouble shooting is described to access the WWW server 24 (step S31). At this time, the monitor unit 12 can determine a unique URL of a proper page from the status code as mentioned above. Thus, the proper page in which the explanation about the first step of the trouble shooting is described is sent from the WWW server 24 and displayed on the monitor 14a.

When an operator executes one step of the trouble shooting while viewing the monitor 14a, a signal indicating that the one step of the process was finished normally is sent from the sensors provided in various places of the measuring device 1 to the control unit 11 (Step S32).

Note here that other than the configuration of allowing the various places of the measuring device 1 to detect that one step of the trouble shooting is finished from the output from the sensor, a configuration may be employed in which the control unit 11 detects that the step is finished by providing each page of the trouble shooting procedure manual with a "Finish" button, etc. by which an operator can confirm and input when the step described in the page is finished.

When one step of the maintenance procedure is finished, the control unit 11 determines whether or not all the steps are finished (step S33), and if all the steps are not finished, the procedure returns to the step S31. At this time, the monitor unit 12 detects this and sends an indication to the communication unit 16, and designates a URL of a page in which the explanation about the next step of the trouble shooting based on the status code of the control unit 11 to access the WWW server 24. Thus, the page in which the explanation about the next step of the trouble shooting is sent from the WWW server 24 and displayed on the monitor 14*a*. The above-mentioned operations are repeated until all the trouble shooting are finished.

Note here that when it is necessary to replace expendables during the trouble shooting procedure, an ordering screen of the expendables is incorporated in the last page of the trouble shooting manual, the same as shown in FIG. 8. After all the steps of the trouble shooting are finished, the operator of the measuring device 1 inputs the necessary number of each expendable and presses a button with an indication "Order," and thereby the input unit 15 forms order data of respective expendables and sends them to the WWW server 24 via the communication unit 16 (Step S34).

In this way, since the monitor unit 12 obtains a proper page for the procedure of the trouble shooting from the WWW server 24 and allows it to be displayed on the monitor 14*a*, the operator can handle the trouble easily by advancing work in accordance with the content displayed on the monitor 14*a*. Furthermore, if it is necessary to replace expendables during the trouble shooting, since it is possible to order expendables on the ordering screen displayed most recently, it is possible to prevent forgetting ordering and to save time and effort.

Finally, the control unit 11 sends the indication to the display processing unit 14 and returns the display status on the monitor 14*a* to the display status at the time when a trouble occurs, which is stored in the storage region in the step S30 (Step S35). Thus, since a work of inspection of the inside the measuring device 1 or replacement of components is carried out during the trouble shooting, even if the main power supply 17 is turned off and the main power supply 17 is turned on again after the work is finished, the display status of the monitor 14*a* returns not to the initial screen but to the screen at the time trouble occurs. Therefore, an operator of the measuring device 1 easily can return to the work before the trouble occurs.

Note here that the flow charts in FIGS. 2 to 4 show an example in which an ordering screen is incorporated in a page explaining the last step of the maintenance process and the trouble shooting in the operation manual, and the input and sending of the order data are carried out after all the steps are finished. However, the timing of input and sending of the order data is not necessarily limited to this, and input and sending of the order data can be carried out at an arbitrary stage in the maintenance process and trouble shooting.

For example, by providing each page having an explanation about the step including the replacement of expendables with an ordering screen, the ordering may be carried out each time. Alternately, by providing each page having an explanation about the step including the replacement of expendables with an ordering screen into which the necessary number etc. is allowed to be input and after all the steps are finished, ordering of all the expendables may be confirmed in total after all the steps are finished.

Alternately, a page for explaining the procedure of a maintenance process and the trouble shooting and an ordering screen of each expendable may be configured separately and jumped by a hyperlink from a page for explaining the procedure of the maintenance process and the trouble shooting to a page including an ordering screen of expendables.

Figure 9:
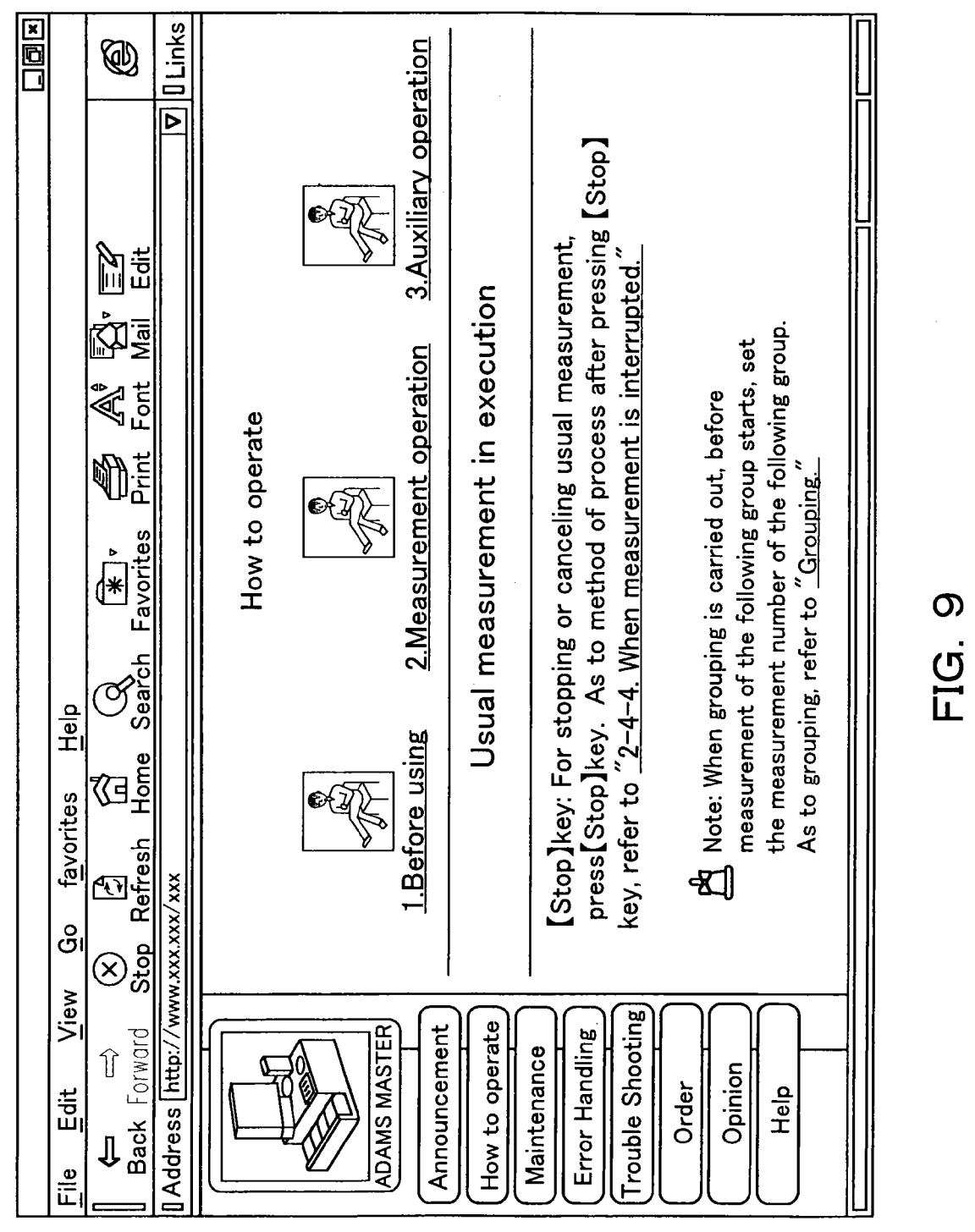
Figure 15:
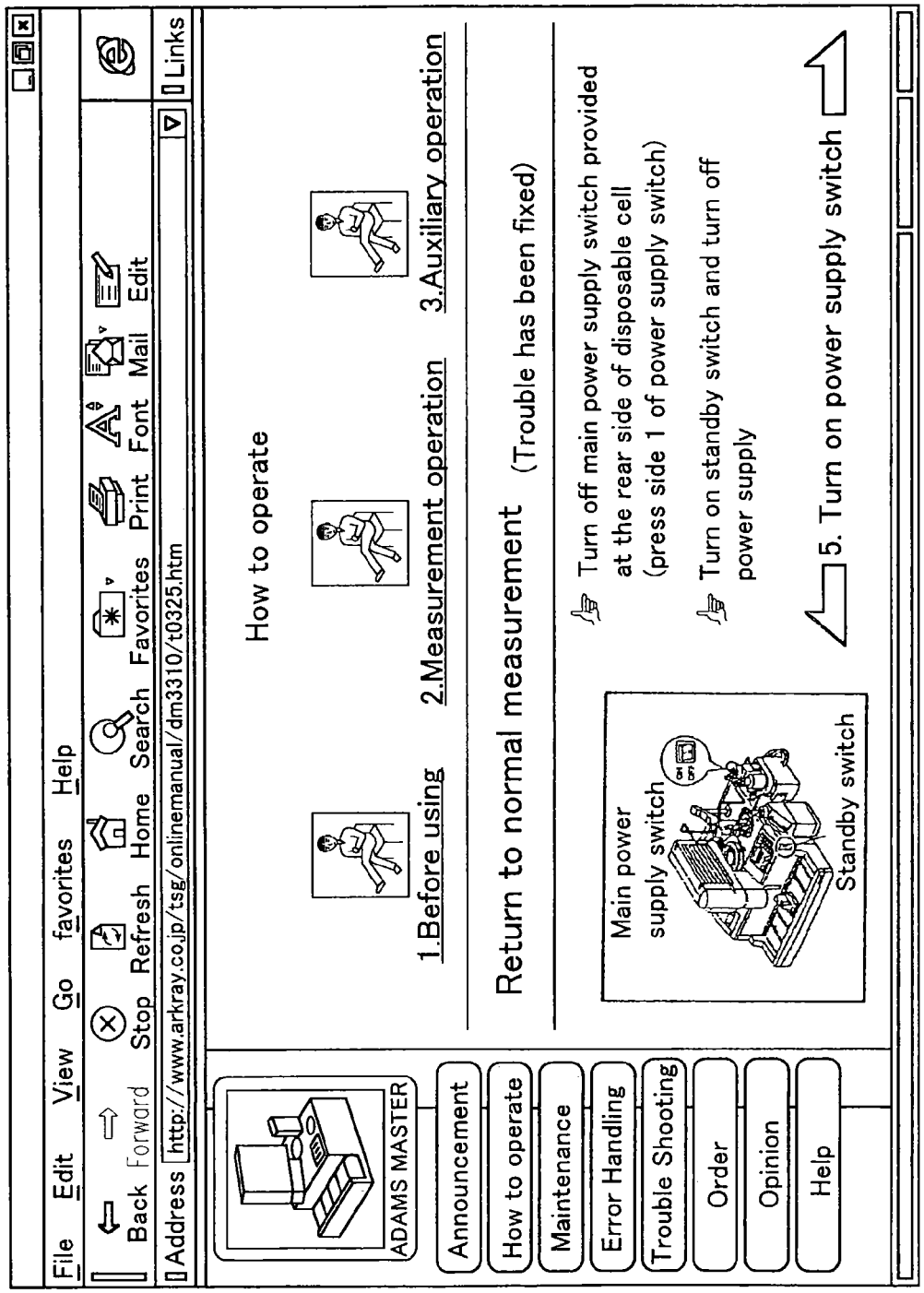
FIG. 15 is a view explaining an example of a page displayed following the page shown in FIG. 14.

Herein, FIGS. 9 and 15 show specific examples of a series of pages to be displayed on the monitor 14*a* from the time trouble occurs to the time the trouble shooting is finished. Note here that in the below mentioned explanation, the domain name of the WWW server 24 is to be "www.arkray.co.jp".

FIG. 9 shows an example of a page displayed on the monitor 14*a* when trouble occurs. Herein, it is assumed that when an operator operates the device in accordance with the indication of this page, a trouble occurs in which wash water overflows a cell washing part (not shown) of the measurement processing unit 13.

When the wash water overflows, the sensor of the measurement processing unit 13 detects this and sends a signal to the control unit 11, and thereby the control unit 11 detects that the trouble occurs and the trouble shooting as shown in FIG. 4 starts. The status code of the control unit 11 at this time is a code assigned uniquely to the event "Overflow of wash water in the cell washing part," and this code herein is "T0320." Note here that a status displayed on the monitor 14*a* at the time the trouble occurs shown in FIG. 9 is stored in the storage region possessed by the display processing unit 14.

Figure 10:
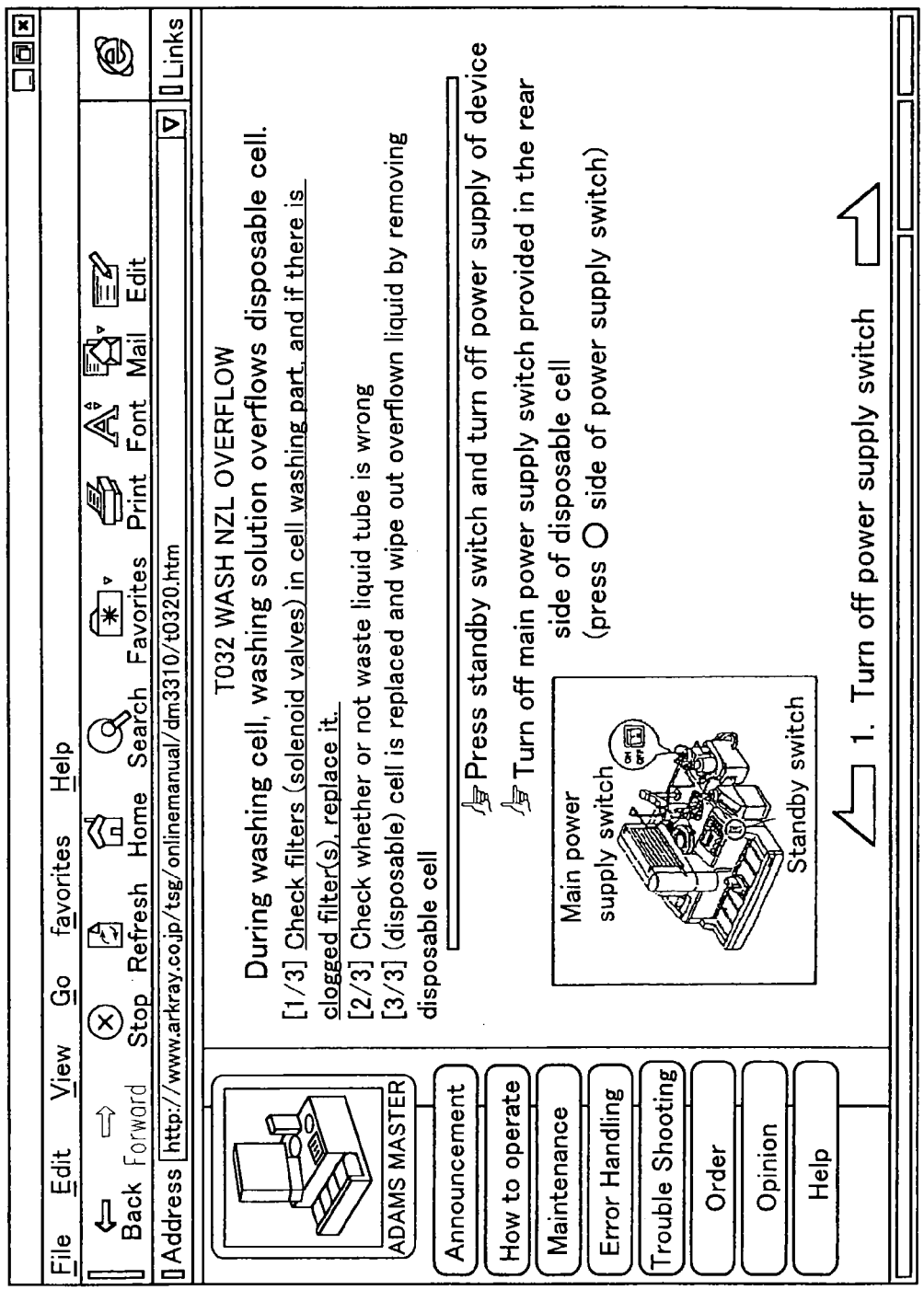
FIG. 10 is a view explaining an example of a page displayed after trouble occurs and indicating a first step of a procedure for coping with the trouble.

The monitor unit 12 designates "http colon slash slash www period arkray period co period ip slash tsg slash onlinemanual slash dm3310 slash to320 dot htm" as a URL to be requested to the WWW server 24 based on the status code. Thus, as shown in FIG. 10, HTML information explaining the procedure: "1. Turn off power supply switch" is sent from the WWW server 24 and displayed on the monitor 14*a*.

Note here that in accordance with the indication shown in a page of FIG. 10, even if an operator turns off the switch of the main power supply 17 of the measuring device 1, since the monitor power supply 18 supplying the control unit 11, the monitor unit 12, the display processing unit 14, the input unit 15 and the communication unit 16 with electric power is provided separately from the main power supply 17 as mentioned above, the display status of the monitor 14*a* and the connection status of the WWW server 24 are maintained.

When the operator turns off a main power supply switch of the measuring device 1, the control unit 11 detects this and outputs the status code "T0321" to the monitor unit 12. The monitor unit 12 makes a URL, requesting the WWW server 24 to transfer via the communication unit 16 based on this status code, to be "http colon slash slash www period arkray period co period ip slash tsg slash onlinemanual slash dm3310 slash to320 dot htm." Thus, HTML information about the following page of the HTML information is sent from the WWW server 24 and a page shown in FIG. 11 is displayed on the monitor 14*a*.

Figure 11:
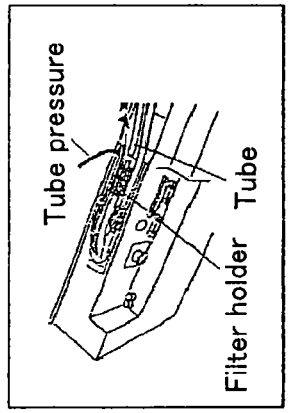
FIG. 11 is a view explaining an example of a page displayed following the page shown in FIG. 10.
Figure 12:
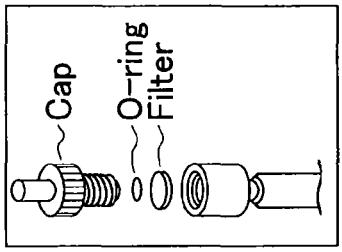
FIG. 12 is a view explaining an example of a page displayed following the page shown in FIG. 11.

Furthermore, when the operator detaches one tube of the filter holder in accordance with the indication in the page shown in FIG. 11, the sensor detecting that this tube is turned off sends a signal to the control unit 11, whereby the status code of the control unit 11 becomes "T0322" and the monitor unit 12 detects this and makes a URL requesting to the WWW server 24 to transfer via the communication unit 16 to be "http colon slash slash www period arkray period co period ip slash tsg slash onlinemanual slash dm3310 slash to320 dot htm." Thus, a page shown in FIG. 12 is displayed on the monitor 14*a*.

Figure 13:
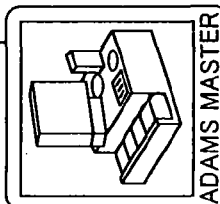
FIG. 13 is a view explaining an example of a page displayed following the page shown in FIG. 12.

Continuously, when the operator replaces filters and O-rings and closes a cap of the filter holder in accordance with the indications shown in FIG. 12, the sensor provided in the filter holder part detects this and sends a signal to the control unit 11. Thereby, the status code of the control unit 11 becomes "T0323," and the monitor unit 12 detects this and makes the URL requesting the WWW server 24 to transfer via the communication unit 16 to be "http colon slash slash www period arkray period co period ip slash tsg slash onlinemanual slash dm3310 slash to320 dot htm." Thus, as shown in FIG. 13, a page including an ordering screen of the replaced components is displayed on the monitor 14a. That is, in this example, the operation manual is formed so that a page including an ordering screen is displayed in the page following the page indicating the replacement of components.

The operator inputs the number of necessary components to be purchased and clicks a box with an indication "Order" so as to allow a check mark to be displayed, and further clicks "Decision of purchases." Thereby, the order data is formed by the input unit 15 and sent to the WWW server 24 via the communication unit 16.

Figure 14:
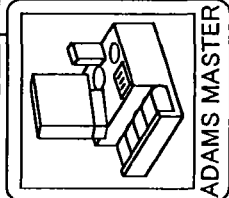
FIG. 14 is a view explaining an example of a page displayed following the page shown in FIG. 13.

After the sending of the order data is finished, the status code of the control unit 11 becomes "T0324," and then the monitor unit 12 detects this and makes a URL requesting the WWW server 24 to transfer via the communication unit 16 to be "http colon slash slash www period arkray period co period ip slash tsg slash onlinemanual slash dm3310 slash to320 dot htm." Thus, a page shown in FIG. 14 is displayed on the monitor 14a.

In accordance with the indication shown in FIG. 14, the operator inserts the tube into the filter holder, a sensor detecting that this tube is inserted sends a signal to the control unit 11 and the status code of the control unit 11 becomes "T0325". Then, the monitor unit 12 detects this and makes a URL requesting the WWW server 24 to transfer via the communication unit 16 to be "http colon slash slash www period arkray period co period ip slash tsg slash onlinemanual slash dm3310 slash to320 dot htm." Thus, as shown in FIG. 15, a page explaining the procedure of turning on a switch of the main power supply again is displayed on the monitor 14a.

Then, in accordance with the indication of this page, the operator turns on the main power supply 17 again and the display processing unit 14 obtains a display status at the time trouble occurs from the storage region, thereby returning the display status of the monitor 14a to the display status when a trouble occurs shown in FIG. 9.

As mentioned above, the operator of the measuring device 1 can carry out a trouble shooting in accordance with the operation manual displayed on the monitor 14a, as well as, carry out ordering of the components by means of an ordering screen incorporated in the operation manual.

Furthermore, after the trouble shooting is finished, since the monitor 14a returns to the display status before the trouble occurs, the operator can return to the original work easily. Note here that as a mechanism for storing the display status of the monitor 14a and returning to the display status later, it is possible to use, for example, a mechanism such as Cookie used in Java Script.

Note here that since the measuring device 1 includes "Ordering" as options on the menu screen of the top page shown in FIG. 5. Besides a method for ordering expendables during the above-mentioned maintenance process or trouble shooting, needless to say, when the operator selects an object "Order" from the top page, regardless of the maintenance process or trouble shooting, it is possible to order arbitrary expendables.

Furthermore, in the above explanation, an embodiment in which in the measuring device 1 is a client device, the monitor unit 12 determines a URL of the corresponding page of the operation manual based on the status code of the measuring device 1 and sends the determined URL to the WWW server 24 was explained as an example. However, the present invention is not necessarily limited to this embodiment. For example, there may be a mechanism in which the status code is usually sent to the intra-company system 2 from the measuring device 1, and the other server device, etc. provided in the WWW server 24 or the intra-company system 2 monitors the status code sent from the measuring device 1, determines a URL of the corresponding page of the operation manual when a certain status code is received, for example, when trouble occurs in the measuring device 1, and sends the HTML data of the determined URL from the WWW server 24 to the measuring device 1.

In this embodiment, an example in which the client device and the server device are connected to each other via the Internet was explained, the communication line is not limited to a wide area network, and a communication line between the client device and the server device may be a private circuit or public circuit. Furthermore, the communication line connecting between the client device and the server device is not limited to circuit switched network, and it may be a packet switched network.

Furthermore, FIGS. 5 to 15 of this embodiment shows an example using Internet Explorer (IE) of Microsoft Corporation as a browser, respectively. However, the browser used by the client device is not necessarily limited to this.

Furthermore, a language describing an online manual of the client device is not limited to an HTML, and XML, VRML, CGI, Java Script, Active X document or other various WEB page descriptive languages can be used.

INDUSTRIAL APPLICABILITY

As mentioned above, according to the present invention, an arbitrary device such as a measuring device, etc. is used as a client device and a proper operation manual in accordance with the status of the client is provided from the server device to the client device. Thereby it is possible to provide a client support system capable of improving the working efficiency of the client device.

The invention claimed is:

1. A client support system comprising:
    a client device comprising a display unit for analyzing a page description language to be displayed; and
    a server device accessed by the client device via a communication line and providing the client device with an operation manual in which each page is described in the page description language;
    wherein the client device comprises a monitor unit for monitoring the status of the client device and a communication control unit for accessing the server device via the communication line, and the monitor unit requests from the server device a page in the operation manual in accordance with the status of the client device via the communication control unit,
    the server device sends the page requested by the client device to the client device, and
    the client device comprises at least two routes of power supplies that are independent from one another, and the display unit, the monitor unit and the communication control unit are connected only to a second route of power supply that is different from a first route of power supply to be turned off at the time of a maintaining process, so that the display unit, the monitor unit and the communication control unit receive power supply from the second route of the power supply at both times of a normal operation and the maintaining process.

2. The client support system according to claim 1, wherein the display unit of the client device comprises a display status storage unit for storing the display status before starting the maintaining process, and the display unit returns to the display status read out from the display status storage unit when the first power supply is turned on after the maintaining process is finished.

3. The client support system according to claim 1, wherein the operation manual comprises an ordering screen that interactively receives an order for implements or components of the client device and forms order data,
the client device comprises an input processing unit for receiving the input with respect to the ordering screen and at the same time sends the order data to the server device by the communication control unit, and
the server device receives the order data and performs a supply process for the implements or components based on the received order data.

4. The client support system according to claim 3, wherein in the operation manual, the ordering screen for components is incorporated in a page including the description of the replacement of components of the client device.

5. The client support system according to claim 3, wherein in the operation manual, the ordering screen for components is incorporated in a page explaining a series of operation procedures including the replacement of components of the client device and being displayed later than the page including the description of the replacement of components.

6. The client support system according to claim 3, wherein in the operation manual, the ordering screen for components is incorporated in a page called by a hyperlink from the page including the description of the replacement of components of the client device.

7. The client support system according to claim 3, further comprising a supply control device for controlling the supply process of implements or components for the client device, wherein the supply process of implements or components comprises sending the order data from the server device to the supply control device.

8. A client support system comprising:
a client device comprising a display unit for analyzing a page description language to be displayed; and
a server device accessed by the client device via a communication line and providing the client device with an operation manual in which each page is described in the page description language;
wherein the client device comprises a monitor unit for monitoring the status of the client device and a communication control unit for accessing the server device via the communication line, and the monitor unit sends information that represents the status of the client device to the server device via the communication control unit,
the server device sends a page in the operation manual in accordance with the status of the client device to the client device based on the information sent from the client device, and
the client device comprises at least two routes of power supplies that are independent from one another, and the display unit, the monitor unit and the communication control unit are connected only to a second route of power supply that is different from a first route of power supply to be turned off at the time of a maintaining process, so that the display unit, the monitor unit and the communication control unit receive power supply from the second route of the power supply at both times of a normal operation and the maintaining process.

9. The client support system according to claim 8, wherein the display unit of the client device comprises a display status storage unit for storing the display status before starting the maintaining process, and the display unit returns to the display status read out from the display status storage unit when the first power supply is turned on after the maintaining process is finished.

10. The client support system according to claim 8, wherein the operation manual comprises an ordering screen that interactively receives an order for implements or components of the client device and forms order data,
the client device comprises an input processing unit for receiving the input with respect to the ordering screen and at the same time sends the order data to the server device by the communication control unit, and
the server device receives the order data and performs a supply process for the implements or components based on the received order data.

11. The client support system according to claim 10, wherein in the operation manual, the ordering screen for components is incorporated in a page including the description of the replacement of components of the client device.

12. The client support system according to claim 10, wherein in the operation manual, the ordering screen for components is incorporated in a page explaining a series of operation procedures including the replacement of components of the client device and being displayed later than the page including the description of the replacement of components.

13. The client support system according to claim 10, wherein in the operation manual, the ordering screen for components is incorporated in a page called by a hyperlink from the page including the description of the replacement of components of the client device.

14. The client support system according to claim 10, further comprising a supply control device for controlling the supply process of implements or components for the client device, wherein the supply process of implements or components comprises sending the order data from the server device to the supply control device.

15. A client device comprising:
a communication control unit for accessing a server device providing an operation manual in which each page is described in a page description language via a communication line, and a display unit for analyzing the page description language to be displayed, the server device sending a page requested by the client device of the operation manual to the client device;
a monitor unit for monitoring the status of the client device, the monitor unit requesting from the server device a page of the operation manual in accordance with the status of the client device via the communication control unit; and
at least two routes of power supplies that are independent from one another, and the display unit, the monitor unit and the communication control unit are connected only to a second route of power supply that is different from a first route of power supply to be turned off at the time of a maintaining process, so that the display unit, the monitor unit and the communication control unit receive power supply from the second route of the power supply at both times of a normal operation and the maintaining process.

16. The client device according to claim 15, wherein the display unit of the client device comprises a display status storage unit for storing the display status before starting the maintaining process, and the display unit returns to the display status read out from the display status storage unit when the first power supply is turned on after the maintaining process is finished.

17. The client device according to claim 15, wherein the operation manual comprises an ordering screen that interactively receives an order for implements or components of the client device and forms order data, the client device further comprising an input processing unit for receiving the input with respect to the ordering screen and at the same time sends the order data to the server device by the communication control unit.

18. The client device according to claim 17, wherein in the operation manual, the ordering screen for components is incorporated in a page including the description of the replacement of components of the client device.

19. The client device according to claim 17, wherein in the operation manual, the ordering screen for components is incorporated in a page explaining a series of operation procedures including the replacement of components of the client device and being displayed later than the page including the description of the replacement of components.

20. The client device according to claim 17, wherein in the operation manual, the ordering screen for components is incorporated in a page called by a hyperlink from the page including the description of the replacement of components of the client device.

21. A client device comprising:

a communication control unit for accessing the server device providing a page of the operation manual in accordance with the status of the client device in which each page is described in a page description language via a communication line;

a display unit for analyzing the page description language to be displayed;

a monitor unit for monitoring the status of the client device, wherein the monitor unit sends information that represents the status of the client device to the server device via the communication control unit; and at least two routes of power supplies that are independent from one another, and the display unit, the monitor unit and the communication control unit are connected only to a second route of power supply that is different from a first route of power supply to be turned off at the time of a maintaining process, so that the display unit, the monitor unit and the communication control unit receive power supply from the second route of the power supply at both times of a normal operation and the maintaining process.

22. The client device according to claim 21, wherein the display unit of the client device comprises a display status storage unit for storing the display status before starting the maintaining process, and the display unit returns to the display status read out from the display status storage unit when the first power supply is turned on after the maintaining process is finished.

23. The client device according to claim 21, wherein the operation manual comprises an ordering screen that interactively receives an order for implements or components of the client device and forms order data, the client device further comprising an input processing unit for receiving the input with respect to the ordering screen and at the same time sends the order data to the server device by the communication control unit.

24. The client device according to claim 23, wherein in the operation manual, the ordering screen for components is incorporated in a page including the description of the replacement of components of the client device.

25. The client device according to claim 23, wherein in the operation manual, the ordering screen for components is incorporated in a page explaining a series of operation procedures including the replacement of components of the client device and being displayed later than the page including the description of the replacement of components.

26. the client device according to claim 23, wherein in the operation manual, the ordering screen for components is incorporated in a page called by a hyperlink from the page including the description of the replacement of components of the client device.

* * * * *